United States Patent [19]

Teplitz

[11] 3,758,954
[45] Sept. 18, 1973

[54] APPARATUS FOR MEASURING LENGTHS OF LINEAR MATERIAL

[75] Inventor: Alfred Teplitz, Pittsburgh, Pa.

[73] Assignee: United States Steel Corporation, Pittsburgh, Pa.

[22] Filed: Apr. 23, 1971

[21] Appl. No.: 136,806

[52] U.S. Cl. ............................ 33/141 F, 33/134 R
[51] Int. Cl. ........ G01b 3/12, G01b 5/04, G01b 7/04
[58] Field of Search ...................... 33/125 M, 141 F, 33/134 R, 132, 133, 129

[56] References Cited
UNITED STATES PATENTS

| | | | |
|---|---|---|---|
| 1,579,260 | 4/1926 | Tiller | 33/134 R |
| 2,782,516 | 2/1957 | Stoeckel et al. | 33/129 |
| 2,033,970 | 3/1936 | Anderson | 33/141 F |

FOREIGN PATENTS OR APPLICATIONS

| | | | |
|---|---|---|---|
| 626,185 | 2/1936 | Germany | 33/134 R |
| 1,548,236 | 7/1969 | Germany | 33/141 F |

*Primary Examiner*—Louis R. Prince
*Assistant Examiner*—Steven L. Stephan
*Attorney*—Donald S. Ferito

[57] ABSTRACT

Apparatus and method include the use of an endless loop of accurately calibrated tape trained around a plurality of pulleys with means for maintaining contact between the tape and moving linear material to be measured. A leg of the endless loop is arranged to parallel the moving linear material in close proximity thereto. A ribbon of magnets or other clamping means mounted on an endless chain is positioned parallel to the aforementioned leg of the tape. The magnets releasably clamp the leg of the tape to the moving linear material, causing the leg (and thus the loop) of the tape to move exactly as the linear material moves. By counting the number of times the loop of tape has circulated (and adding to this number any fractional part of a length of loop that has passed), the exact length of linear material that has passed a fixed point can be determined.

13 Claims, 7 Drawing Figures

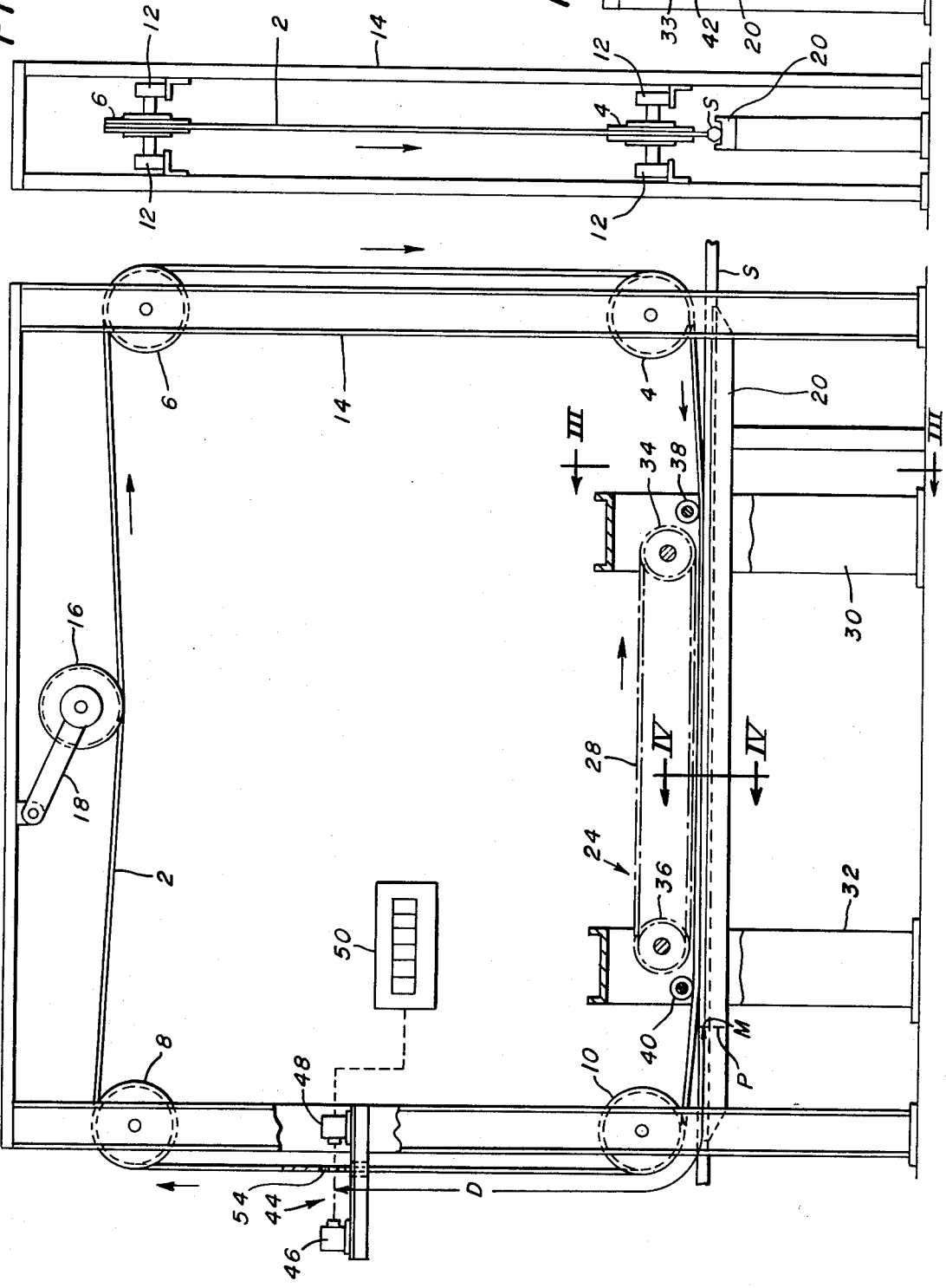

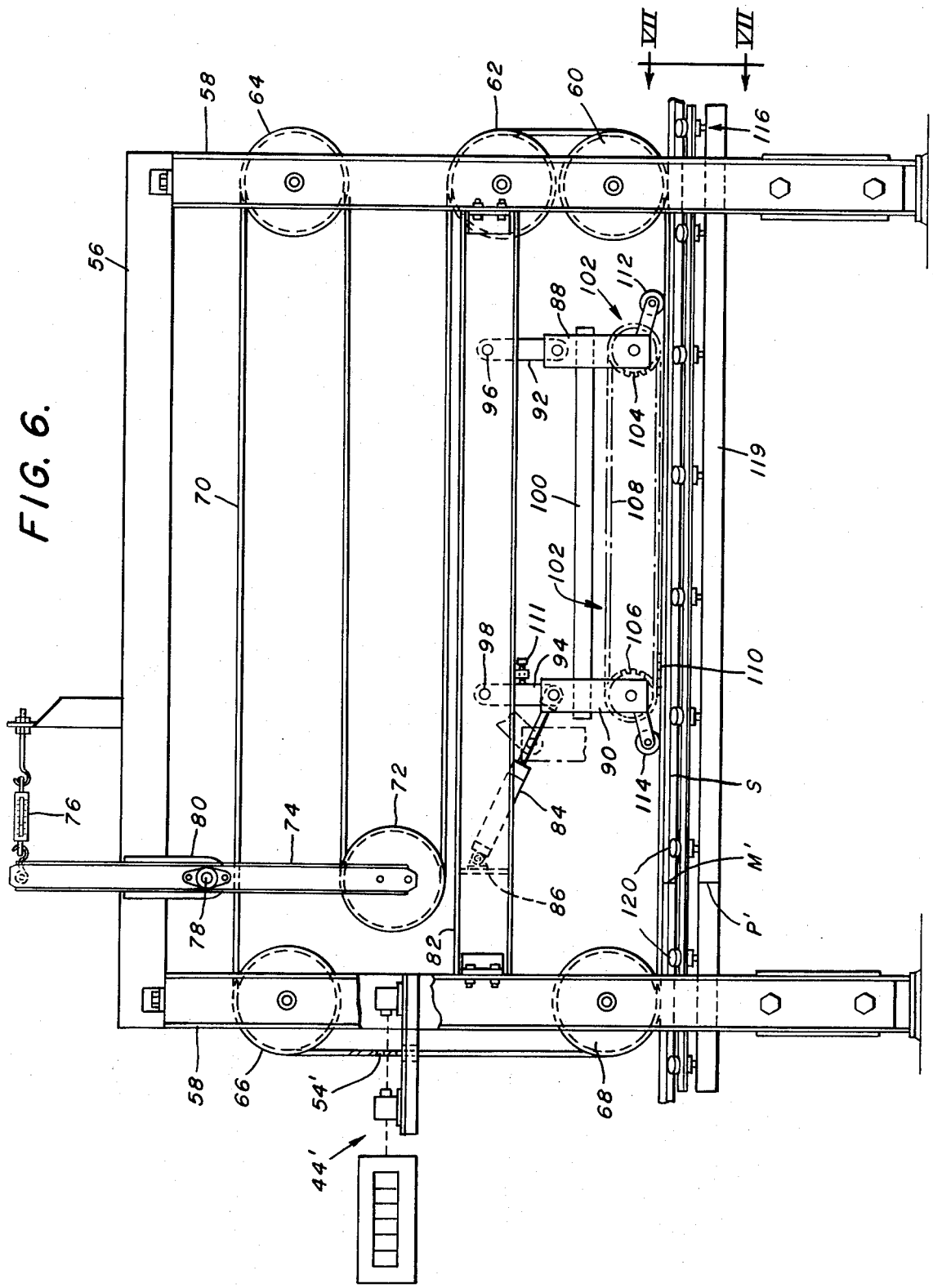

APPARATUS FOR MEASURING LENGTHS OF LINEAR MATERIAL

BACKGROUND OF THE INVENTION

The present invention relates generally to the production of linear or elongated material and more particularly to a measuring apparatus and method especially suitable for use where production of individual lengths of linear material having highly accurate length dimensions is required.

Recent experience has indicated that shop assembly of parallel-wire bridge strands offers substantial time and cost savings in suspension bridge erection as compared with conventional on-site strand spinning. As a result methods for shop assembling parallel-bridge strands have been developed.

In association with the development of such shop-assembly methods a problem arose that was not solved prior to my invention. This problem concerned the necessity of furnishing assembled strands to exact lengths. Successful shop assembly of parallel-wire bridge strands requires that strands be furnished in exact lengths as called for by erection specifications. This requires that strands be furnished in lengths accurate in the order of two feet in 5,000 feet, which corresponds to an accuracy in mensuration of 0.04 percent, an unusually rigid requirement. A strand may be composed, for example, of 91 parallel high carbon steel wires 0.192 inch in diameter, laid up in the form of a perfect hexagon and seized with pressure sensitive tapes spaced at 3 foot intervals.

Prior to my invention, various types of measuring tools, such as wheel-type devices, have been used for various measurement functions. However, none of these have been satisfactory for measuring bridge strand lengths, or other linear products having very limited length tolerances, with the high degree of accuracy required.

Examples of various types of measuring tools used prior to my invention are disclosed by the following U.S. patents:

| Patent No. | Issued |
|---|---|
| 1,614,605 | Jan. 18, 1927 |
| 2,087,335 | July 20, 1937 |
| 2,782,516 | Feb. 26, 1957 |

It is, accordingly, the primary object of my invention to provide an apparatus and method for measuring lengths of linear material to a high degree of accuracy while such material is being produced or assembled.

It is another object of my invention to provide an apparatus and method for accurately measuring lengths of linear magnetic material in which apparatus and method there is inherent automatic compensation for variations in the elongation of the material being measured due to temperature changes in such material.

A further object of my invention is to provide an apparatus for measuring lengths of linear magnetic material which is relatively simple to maintain and operate.

A more specific object of my invention is to provide an apparatus and method for measuring lengths of linear magnetic material such as parallel-wire suspension bridge strands which include the use of an endless loop of accurately calibrated steel tape of predetermined linear dimension trained around a plurality of pulleys; a leg of the endless loop of tape being arranged to parallel the moving linear material in close proximity thereto; a ribbon of magnets mounted on an endless chain positioned parallel with the aforementioned leg of the tape so that the magnets clamp the leg of the tape to the moving linear material and cause the loop of tape to advance exactly the same distance the linear material advances; and counting the number of times the loop of tape has circulated and adding to this number any fractional part of a length of the loop that has circulated to determine the exact length of linear material that has passed.

These and other objects will become more apparent after referring to the following specification and attached drawing, in which:

BRIEF DESCRIPTION OF THE DRAWING

FIG. 1 is a front elevational view partly in section of a preferred embodiment of the invention;

FIG. 2 is an elevational view looking at the right end of FIG. 1 from the right;

FIG. 3 is a vertical sectional view taken substantially along the line III—III of FIG. 1;

FIG. 6 is a front elevational view of a modified embodiment of the invention.

DESCRIPTION OF THE PREFERRED EMBODIMENT

Figure 5:
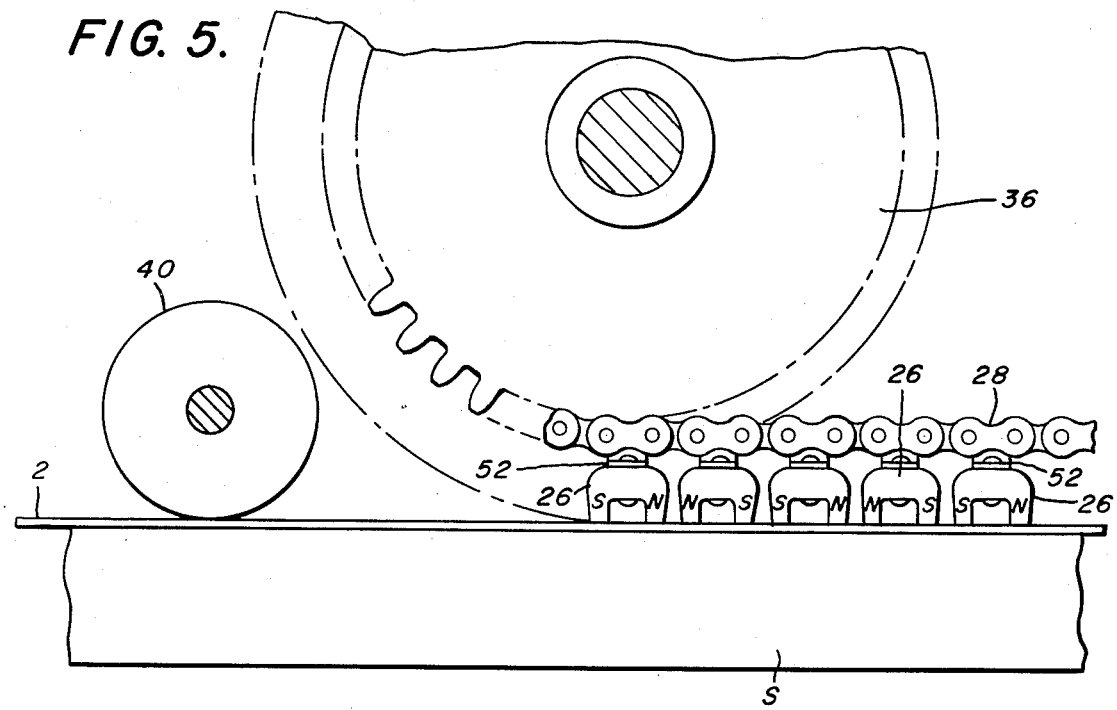
FIG. 5 is an enlarged partial front elevational view showing the magnet and sprocket arrangement of FIG. 1.

Referring now particularly to FIGS. 1 through 5, a closed loop of calibrated steel tape 2 marked with graduation indicia is supported by four flanged pulleys 4, 6, 8 and 10, which pulleys are journaled in anti-friction bearings 12 mounted on an upright frame 14 to allow easy movement of the tape loop 2. In order to accurately calibrate the tape 2, a constant, known tension must be maintained on the tape. To achieve such tension, I have provided an adjustably weighted pulley 16. The pulley 16 is supported on the frame 14 by an arm and bearing assembly 18 and held in contact with the tape 2 by any suitable, low friction means such as flanges on the pulley 16.

Within the frame 14 and below the tape 2 is a horizontal support means 20 arranged to constrain the lateral motion of a traveling strand S while supporting the strand along a portion of its length.

An assembly 24 of magnets 26 are mounted in close proximity to each other on an endless belt 28. The magnets 26 are of the horseshoe type and are arranged with the like poles of adjacent magnets adjacent each other, as best shown in FIG. 5. The magnet assembly 24 is preferably supported above the leg of the tape loop 2 which spans the distance from the pulley 4 to pulley 10. Structural supports 30 and 32 provide support for anti-friction bearings 33 which journal sprockets 34 and 36, respectively, of the magnet assembly 24. The endless belt 28 is in the form of a roller chain trained about the sprockets 34 and 36. Rollers 38 and 40 journaled in anti-friction bearings 42 on the structural supports 30 and 32 may be provided to bear against the tape 2 ahead of and following, respectively, the magnet assembly 24. The rollers 38 and 40 act as strippers to overcome any tendency of the tape to follow the magnet assembly 24 as it moves around the sprockets 34 and 36.

To avoid the necessity for manually counting the number of circuits of the tape, a photo-electrically actuated digital counter assembly 44 made up of a photo-electric energy source 46, a photo-cell detector 48 and a digital counter 50 may be provided to count the number of circuits of the tape 2, as will be more fully explained hereinafter.

Figure 4:
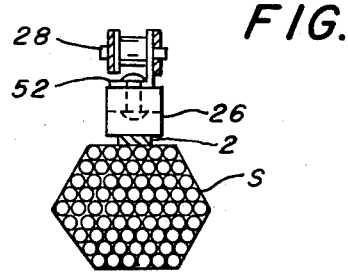
FIG. 4 is a cross-sectional view taken substantially along the line IV—IV of FIG. 1.

As shown in FIGS. 4 and 5, the endless belt roller chain 28 is provided with attachment link plates 52, each of which link plates 52 is attached to a single horseshoe magnet 26. The magnets 26 are spaced suitably to form an essentially continuous ribbon of magnets with the like poles of adjoining magnets being adjacent to each other.

A single hole 54 is provided in the tape 2. The photo-cell detector 48 is activated when its circuit is completed by sensing a signal from the energy source 46. Thus, each time the hole 54 passes between the photo-electric energy source 46 and the photo-cell detector 48, the circuit of the photo-cell detector 48 is activated. With the detector circuit thus energized, the counter 50, which may be arranged to indicate either tape revolutions or tape revolutions times tape length, is actuated.

While it is possible to provide a plurality of holes 54 along the tape 2 to thus energize the counter assembly 44 at shorter (e.g. 1 foot) intervals, this is not practical because under shop conditions, the holes would tend to be plugged or blocked by dirt, thus resulting in errors in counting. The use of a single hole 54 is preferred since the operator of the apparatus is not then unduly burdened by maintaining the clearance in a single hole and also because any blockage of the single hole would be immediately detectable since the counting error would be large enough to be noticed.

The following numerical example will explain the operation of the apparatus of the invention:

Assume that the loop of tape 2 is exactly 50 feet in circumference or linear dimension and that it is graduated in feet. The tape 2 is placed on the pulleys 4, 6, 8 and 10 so that as the tape moves to the left, as indicated by the arrows in FIG. 1, the reading on the tape as it passes any given point increases. Assume that a strand 5,009 feet long is to be made and that the starting point for measuring the strand (the strand is continuous as it passes the measuring device of the invention and is cut to length later) is mark M on the strand. Mark M is opposite a fixed point P on the support 20 at the start of the measuring operation. The distance D along the tape between the point P and the energy path between the energy source 46 and receiver 48 is known. The hole 54 in the tape 2 is at a distance from the zero graduation on the tape slightly greater (approximately 0.50 inch) than the distance D.

The tape and strand are relatively adjusted so that the mark M on the strand and the zero graduation on the tape are both opposite the point P. It should be noted that in order to move the tape 2 alone with respect to the strand, it is necessary to move the magnets 26 away from the tape. This can most easily be accomplished by introducing a length of fabric belting or similar non-magnetic material between the magnets and the tape to provide an air gap and reduce the clamping effects of the magnets to the point where the tape can be adjustably moved alone as necessary.

Now as the strand is advanced to the left as viewed in FIG. 1, we must count 5009/50 circuits of the zero graduation which amounts to 100 circuits (since the tape is 50 feet long) plus 9 feet. After 100 circuits have been completed, a second mark is made on the strand opposite the 9 feet mark on the tape, which second mark will then be 5,009 feet from the first mark M. When cuts are made at the two marks, the resultant strand will be 5,009 feet long. Another mark M is then made on the strand and the tape is adjusted so that the zero graduation thereon and the new mark M are both opposite the point P. Then the strand is again advanced and the measuring operation is repeated.

Although I have described my invention as being used to measure lengths of wire strand, it will be understood that it could be used to measure any linear magnetic material. Further, while I have shown the use of magnets to clamp the tape and strand together, it will be clear that other means, such as suction, mechanical clamping or the like instead of magnets, can be used to prevent slippage between the tape or other non-magnetic linear material.

It will be noted that the arrangement of the magnets in the N-S-S-N polar configuration as shown in FIG. 5 is the preferred arrangement for the magnets. I have found that a greater pull is required to cause the tape 2 to slip relative to the strand when the magnets are in a N-S-S-N configuration than when the same closely spaced magnets are arranged in a N-S-N-S alignment. Further, I have found that the close, i.e., almost abutting, spacing of the magnets in the N-S-S-N configuration provides greater holding power than a more widely spaced arrangement of the magnets, for example, three-fourths inch apart.

Although I have described tape 2 as being a steel tape, it will be understood that the tape may be made of other suitable material, such as plastic, cloth, etc., as desired.

Figure 7:
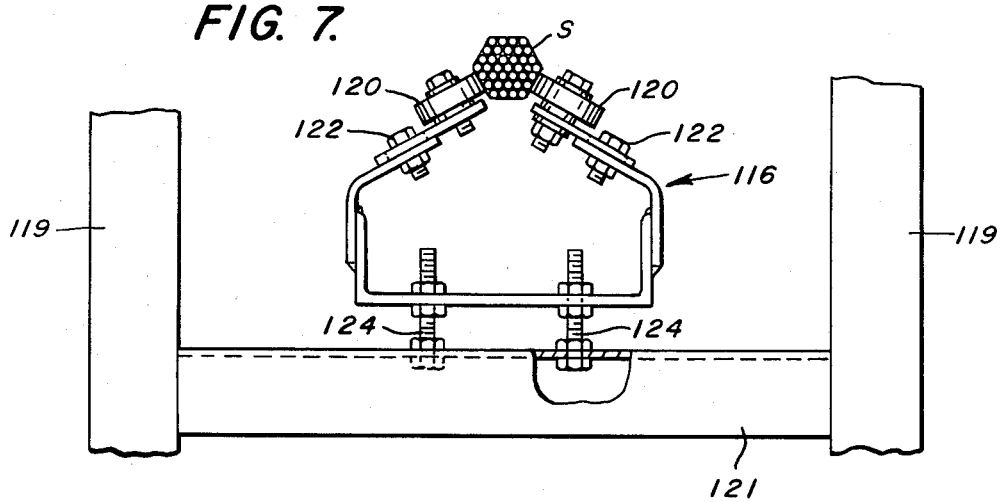
FIG. 7 is an end elevational view taken substantially along the line VII—VII of FIG. 6.

FIGS. 6 and 7 illustrate a modified embodiment of the invention. The modified embodiment includes an upstanding frame 56 having spaced upright structural members 58 on which are journaled flanged pulleys 60, 62, 64, 66 and 68 around which is trained a calibrated tape 70 marked with graduation indicia and having a hole 54' therethrough.

The tape 70 is also trained around a pulley 72 which pulley cooperates with pulley 62 for adjustably tensioning the tape 70 while constantly monitoring the tension to detect and correct any changes. A tensioning arrangement including a pulley mounting arm 74 and a spring scale 76 is provided for maintaining a required predetermined tension in tape 70. The pulley mounting arm 74 is in the form of a suspended yoke which yoke is connected to the spring scale 76. The mounting arm 74 is pivoted intermediate its length as at 78 to a support 80 which is welded to and depends from the upper part of the frame 56. To insure that the tension of the looped tape 70 can be read proportionately from the scale 76, the mounting arm 74 is divided into two legs of equal length, one extending above the pivot point 78 and one extending downwardly from the pivot point. Generally, the tape 70 is looped in such a way that four parallel horizontal legs thereof are formed about the six pulleys 60, 62, 64, 66, 68 and 72.

A pair of beams 82 extends horizontally between the upright members 58 of the frame 56 approximately midway between pulleys 60 and 64 on one end and pulleys 66 and 68 at their opposite ends. An air cylinder 84 is pivotally connected at its head end to a plate 86 which extends transversely between the beams 82. A pair of yokes 88 and 90 is pivotally connected one to each of two links 92 and 94, respectively, which in turn are pivotally attached to bars 96 and 98, respectively, extending between the beams 82. The yokes 88 and 90 are rigidly connected to and separated by a bar 100. A magnet assembly 102, consisting of sprockets 104 and 106, an endless chain 108 trained around the sprockets, and magnets 110 attached to the endless chain, is carried by the yokes 88 and 90. The piston rod of the cylinder 84 is pivotally connected with the yoke 90 so that the magnet assembly 102 is lifted from contact with the tape 70 upon retraction of the piston rod into the cylinder 84. This arrangement results in the lower portions of the yokes 90 and 88 remaining perpendicular to the strand S when the magnet assembly is moved away from the tape 70. An adjustable screw stop 111 depending from the beams 82 adjacent the link 94 may be provided to limit the movement of the magnet assembly in one direction.

Stripper rolls of non-magnetic material 112 and 114 may be provided to prevent the tape from following the magnets around sprockets 104 and 106.

An elongated supporting means 116 is provided for supporting the strand S during measurement. As shown in FIG. 7, the supporting means 116 is vertically adjustable by nut and bolt means 124 projecting upwardly from cross members 121 which extend between a pair of beams 119. Support 116 includes a plurality of adjustably mounted canted wheels 120 adapted to engage and support the strand as it is moving under the measuring apparatus. The wheels 120 can be adjusted for various sizes of strand by means of bolts 122 fitting in slotted bolt holes (not shown). Nut and bolt means 124 permits vertical adjustment of the support 116 so as to maintain the upper surface of the strand S in a fixed relation to the tape 70 regardless of strand diameter. Point P', similar to point P shown in the preferred embodiment of the invention, is marked on one of the beams 119.

A photo-electrically actuated digital counter assembly 44' similar to counter assembly 44 shown in the preferred embodiment of the invention (see FIG. 1) may be provided and operated in the modified embodiment of the invention shown in FIG. 6 to count the revolutions of the loop of tape 70 as is done in the preferred embodiment.

The upright frame 56 may be made vertically adjustable so as to facilitate the manufacture of the apparatus of the invention in prefabricated form usable in any shop.

The modified embodiment of the invention functions to measure lengths in the same manner as that described hereinbefore in relation to the preferred embodiment of the invention and, therefore, such description of the operation will not be repeated here.

It will be apparent now that the method and apparatus of the invention have many advantages over linear measuring devices used heretofore. Some of these advantages are as follows:

1. A calibrated tape marked with graduation indicia is basically more accurate than a wheel-type measuring device since a tape can be read to thousandths of a foot. In the case of a tape 50 feet long this represents one part in 50,000. To obtain this degree of accuracy, a wheel 15 inches in diameter, for example, would have to be accurate in diameter to 0.0003 inch. Such accuracy would be difficult to obtain and even more difficult to maintain when wear, slippage and dirt pickup are considered.

2. Using a tape in accordance with my invention, slippage is effectively prevented. For example, experiments have shown that with five feet of a ribbon of Alnico magnets contacting the tape, a pull of about 50 pounds would be required to cause the tape to slip on the product being measured.

3. Since in utilizing my invention the actual measuring surface, the tape, has an essentially unchanging "diameter", the effects of dirt and wear from product contact, which normally affects the diameter and thus the accuracy of wheel type measuring devices, are minimized.

4. Temperature generally affects the diameter of a wheel through expansion or deformation of the wheel circularity and, therefore, its accuracy is reduced.

5. The materials from which wheel-type measuring devices may be constructed is restricted to those of non-damaging textures because of the contact between the wheel and the material to be measured. Utilizing a tape in accordance with my invention is restricted only where the magnetic field is so affected as to lose its holding power where magnetic force is utilized to clamp the tape to the material being measured.

6. A tape of the same composition as the material being measured assumes the temperature of the material being measured and, therefore, expands or contracts to almost identically correspond with the expansion and contraction of the material being measured. The matched expansions and contractions provide increased accuracy at all temperature ranges, a capability not found in measurement systems heretofore known.

While I have shown but two embodiments of my invention, other adaptations and modifications may be made without departing from the scope of the following claims.

I claim:

1. Apparatus for measuring the length of longitudinally moving linear magnetic material which comprises a frame, a plurality of spaced pulleys rotatably mounted on said frame, an endless loop of tape of predetermined linear dimension trained for travel around said pulleys, a portion of the path of travel of said tape extending substantially in a single plane, means for supporting said linear magnetic material along a portion of its path of movement adjacent one side of said single plane portion substantially parallel therewith, spaced sprockets journaled in said frame, an endless chain trained around said sprockets, one flight of said endless chain extending substantially parallel with said single plane portion on the side thereof opposite said linear material, a plurality of magnets strung along said chain, said magnets on said chain being substantially horseshoe type magnets, said magnets being aligned along said chain in close proximity to each other with the poles of each magnet disposed adjacent the like pole of the magnets adjacent thereto, said magnets being directed toward said single plane portion when carried along one flight of said chain to hold together said tape traveling along said single plane portion and the linear material moving adjacent said single plane portion whereby said tape is advanced around said pulleys as said linear material moves longitudinally adjacent said single plane portion, the extent of movement of said tape around said pulleys thereby indicating the total length of linear material moved past a fixed point.

2. Apparatus as defined by claim 1 including means for indicating the extent of travel of said loop of tape around said pulleys.

3. Apparatus as defined by claim 2 in which said indicating means comprises a photo-electric-assembly actuated digital counter comprising a photo-electric energy source disposed on one side of said tape and a photo-electric energy receiving cell disposed on the opposite side of said tape aligned with said energy source, said tape having a hole therethrough whereby a circuit is completed in said photo-electric assembly and said counter is actuated each time the hole in the tape passes between the energy source and the photo-electric receiving cell thereby indicating said tape and linear material have advanced a distance substantially equal to the linear dimension of said endless loop of tape.

4. Apparatus as defined by claim 2 including means for removing said magnets from magnetic contact with said tape.

5. Apparatus as defined by claim 1 in which said tape is of such composition as to expand and contract at the same rate as said linear material expands and contracts when subjected to similar temperature variations.

6. Apparatus as defined by claim 1 including tensioning means mounted on said frame in engagement with said tape for maintaining the latter under predetermined tension.

7. Apparatus as defined by claim 1 including a lever pivotally mounted intermediate its ends on said frame, one of said pulleys carried by one end of said lever, an adjustable counterweight connected with the opposite end of said lever whereby the position of said pulley is adjustable to vary the tension of tape traveling therearound.

8. Apparatus as defined by claim 7 in which said adjustable counterweight is a spring scale.

9. Apparatus as defined by claim 1 in which said support means comprises a flat surface having upright sides for constraining lateral movement of said linear material.

10. Apparatus as defined by claim 1 in which said supporting means comprises a plurality of pairs of spaced, aligned wheels, said pairs of wheels being rotatably mounted and adjustably disposed in oppositely canted disposition adjacent the path of travel of said linear material, said wheels being adapted to engage and support said linear material.

11. Apparatus as defined by claim 1 in which said tape is marked with graduated indicia.

12. Apparatus for measuring the length of longitudinally moving linear magnetic material which comprises a frame, a plurality of spaced pulleys rotatably mounted on said frame, an endless loop of tape of predetermined linear dimension trained for travel around said pulleys, a portion of the path of travel of said tape extending substantially in a single plane, means for supporting said linear magnetic material along a portion of its path of movement adjacent one side of said single plane portion substantially parallel therewith, spaced sprockets journaled in said frame, an endless chain trained around said sprockets, one flight of said endless chain extending substantially parallel with said single plane portion on the side thereof opposite said linear material, a plurality of magnets strung along said chain, each of said sprockets being mounted in the lower portion of a clevis element, each of said clevises being pivotally mounted on a support bar pivotally carried by a link, said link being pivotally mounted on said frame, said clevises being rigidly connected together for common pivotal movement about said support bars, means connected with one of said support bars for moving said bars to move said magnets toward and away from engagement with said tape, means for selectively restricting the pivotal movement of said links, said magnets being directed toward said single plane portion when carried along said one flight of said chain to hold together said tape traveling along said single plane portion and the linear material moving adjacent said single plane portion whereby said tape is advanced around said pulleys as said linear material moves longitudinally adjacent said single plane portion, the extent of movement of said tape around said pulleys thereby indicating the total length of linear material moved past a fixed point.

13. Apparatus as defined by claim 12 in which said support moving means comprises a pressure fluid cylinder having a retractable piston rod projecting therefrom, the free end of said piston rod being pivotally connected with said one of said support bars.

* * * * *